United States Patent
Tseng et al.

(10) Patent No.: US 8,524,409 B2
(45) Date of Patent: Sep. 3, 2013

(54) FLOW REGULATOR FOR FUEL CELL

(75) Inventors: Chung-Jen Tseng, Taoyuan County (TW); Tad Tsai, Changhua County (TW); Tung-Chieh Chen, Taoyuan County (TW)

(73) Assignee: National Central University, Taoyuan County (TW)

( * ) Notice: Subject to any disclaimer, the term of this patent is extended or adjusted under 35 U.S.C. 154(b) by 529 days.

(21) Appl. No.: 12/801,411

(22) Filed: Jun. 8, 2010

(65) Prior Publication Data

US 2011/0229784 A1    Sep. 22, 2011

(30) Foreign Application Priority Data

Mar. 18, 2010    (TW) ................................ 99108062 A

(51) Int. Cl.
*H01M 8/04* (2006.01)
(52) U.S. Cl.
USPC ........... 429/443; 429/414; 429/446; 429/452; 429/455; 429/456; 429/458
(58) Field of Classification Search
USPC ................. 429/414, 443, 446, 452, 455, 456, 429/458
See application file for complete search history.

(56) References Cited

U.S. PATENT DOCUMENTS

| | | | |
|---|---|---|---|
| 7,972,746 B2 * | 7/2011 | Kallo | 429/512 |
| 2004/0146770 A1 * | 7/2004 | Colton | 429/34 |
| 2004/0214062 A1 * | 10/2004 | Tajiri et al. | 429/25 |
| 2005/0255366 A1 * | 11/2005 | Tighe | 429/38 |
| 2006/0275645 A1 * | 12/2006 | Gallagher et al. | 429/38 |
| 2008/0152987 A1 * | 6/2008 | Nakashima et al. | 429/34 |
| 2009/0181269 A1 * | 7/2009 | Unoki et al. | 429/13 |

FOREIGN PATENT DOCUMENTS

WO   PCT/JP2007/059330    * 11/2007

* cited by examiner

*Primary Examiner* — Ula C Ruddock
*Assistant Examiner* — Amanda Barrow
(74) *Attorney, Agent, or Firm* — Bacon & Thomas, PLLC

(57) ABSTRACT

A fuel-cell flow regulator is placed in a fuel cell having two entrances, each of which is formed at one of two sides of the fuel cell. The fuel cell is composed of a plurality of single cells, each of which includes a fuel inlet and a fuel passage in communication with the fuel inlet. The fuel passages jointly define a fuel tunnel in communication with all of the entrances. The flow regulator is located at the fuel tunnel and movable back and forth along the fuel tunnel.

4 Claims, 5 Drawing Sheets

FLOW REGULATOR FOR FUEL CELL

BACKGROUND OF THE INVENTION

1. Field of the Invention

The present invention relates generally to a fuel cell, and more particularly, to a flow regulator for a fuel cell.

2. Description of the Related Art

As more and more attention is given to environmental protection, every country has been developing various kinds of green energy. Among the green energy technologies, the fuel cell is a high-efficiency, low-pollution, and widely-applied technology, having been regarded as a hot product in conformity with the global trend in the near future. For example, a proton exchange membrane fuel cell (PEMFC) is based on a membrane electrode assembly (MEA), to which the fuel flows through the flow field plate to be oxidized for generating current, wherein the amperage of the current is in direct proportion to the amount of the fuel distributed to the catalyst layer. In other words, the performance of the fuel cell is subject to how much fuel is supplied. However, while the PEMFC generates power, moisture is produced and meanwhile the fuel becomes moist. If the moisture continues to accumulate at the outlet of the fuel cell, an obstruction will result, affecting the inflow of the fuel passing through the inlet and decreasing the performance of the fuel cell. Although attempts have been made to resolve problems associated with moisture accumulation by improving the shape of the flow field plate, known improvements are not satisfactory because, even after the fuel cell is obstructed by moisture, the fuel can still continue to be supplied to the fuel cell, and the pressure of the fuel increases in such a way that the obstructed fuel cell produces a yet greater amount of moisture, so that the obstruction cannot be effectively improved. A result is unstable power generation and decreased performance of the fuel cell.

SUMMARY OF THE INVENTION

The primary objective of the present invention is to provide a flow regulator, which can improve the stability and performance of the fuel cell.

The foregoing objective of the present invention is attained by the fuel-cell flow regulator placed in a fuel cell having two entrances, each of which is formed at one of two sides of the fuel cell. The fuel cell is composed of a plurality of single cells, each of which includes a fuel inlet and a fuel passage in communication with the fuel inlet. The fuel passages jointly define a fuel tunnel in communication with all of the entrances. The flow regulator is located at the fuel tunnel and movable back and forth along the fuel tunnel.

The flow regulator is mounted to the fuel tunnel to be located at a first position, wherein the fuel regulator can be pushed by the flowing fuel in the fuel tunnel. When the fuel cell reacts, the single cells each have different degrees of moisture accumulation to result in different pressures applied to the fuel while the fuel flows into respective fuel inlets. In the meantime, the fuel tends to flow toward a single cell having an inlet under smaller pressure, in such a way that the flow regulator can be pushed to a second position from the first position, thus regulating the flow of the fuel entering the single cell. If one of the single cells is obstructed due to the moisture accumulation, after the fuel flow is regulated, the flow of each of other unobstructed cells is greater than when the flow regulator is located at the first position, helping draining the moisture from the single cell. In addition, the flow regulator is movable along the fuel tunnel subject to the difference of pressure between the single cells for regulation of the flow of the fuel.

DETAILED DESCRIPTION OF PREFERRED EMBODIMENTS

Figure 1:
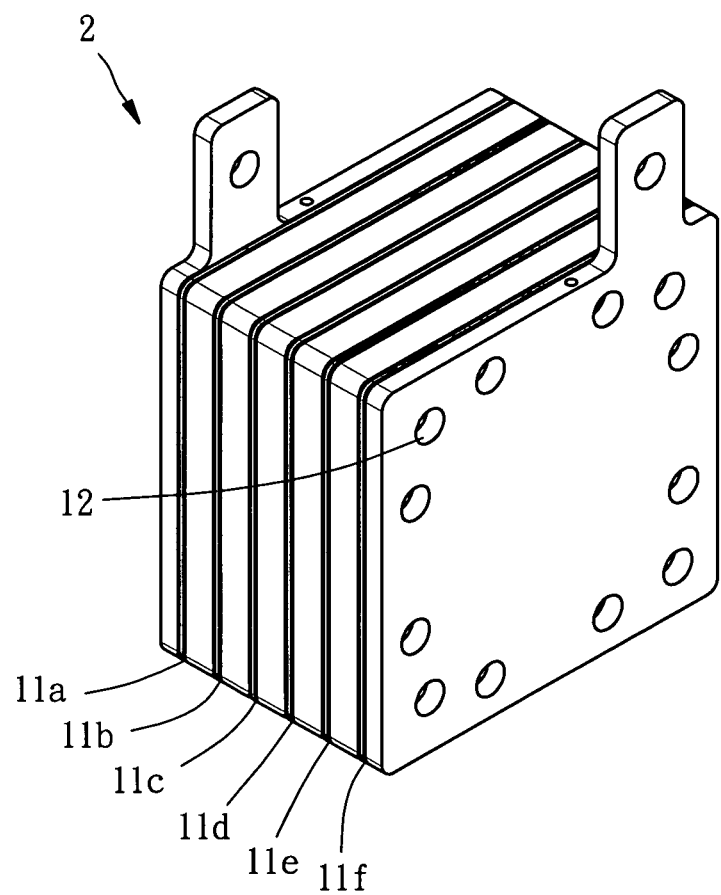
FIG. 1 is a perspective view of a first preferred embodiment of the present invention.
Figure 2:
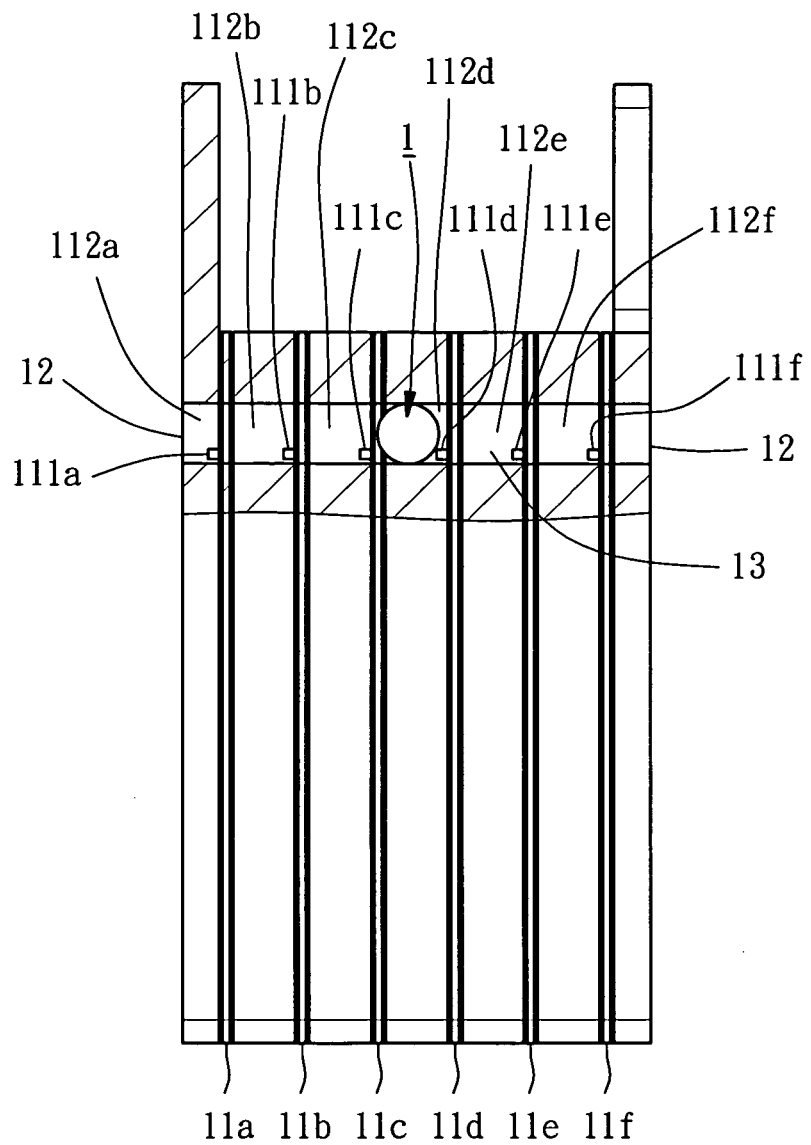
FIG. 2 is a partially sectional view of the first preferred embodiment of the present invention.

Referring to FIGS. 1-2, a flow regulator 1 for a fuel cell 2 in accordance with a first preferred embodiment of the present invention is mounted to the fuel cell 2. The fuel cell 2 is composed of a plurality of single cells defined as a first single cell 11a, a second single cell 11b, a third single cell 11c, a fourth single cell 11d, a fifth single cell 11e, and a sixth single cell 11f. The fuel cell 2 includes two entrances 12, each of which is located at one of two sides of the fuel cell 2. Each of the single cells 11a-11f has a fuel inlet and a fuel passage. The fuel inlets are defined as a first fuel inlet 111a, a second fuel inlet 111b, a third fuel inlet 111c, a fourth fuel inlet 111d, a fifth fuel inlet 111e, and a sixth fuel inlet 111f in turn. The fuel passages are defined as a first fuel passage 112a, a second fuel passage 112b, a third fuel passage 112c, a fourth fuel passage 112d, a fifth fuel passage 112e, and a sixth fuel passage 112f in turn. Each of the fuel inlets 111a-111f communicates with corresponding one of the fuel passages 112a-112f. The fuel passages 112-112f jointly define a fuel tunnel 13 in communication with the entrances 12.

Figure 3:
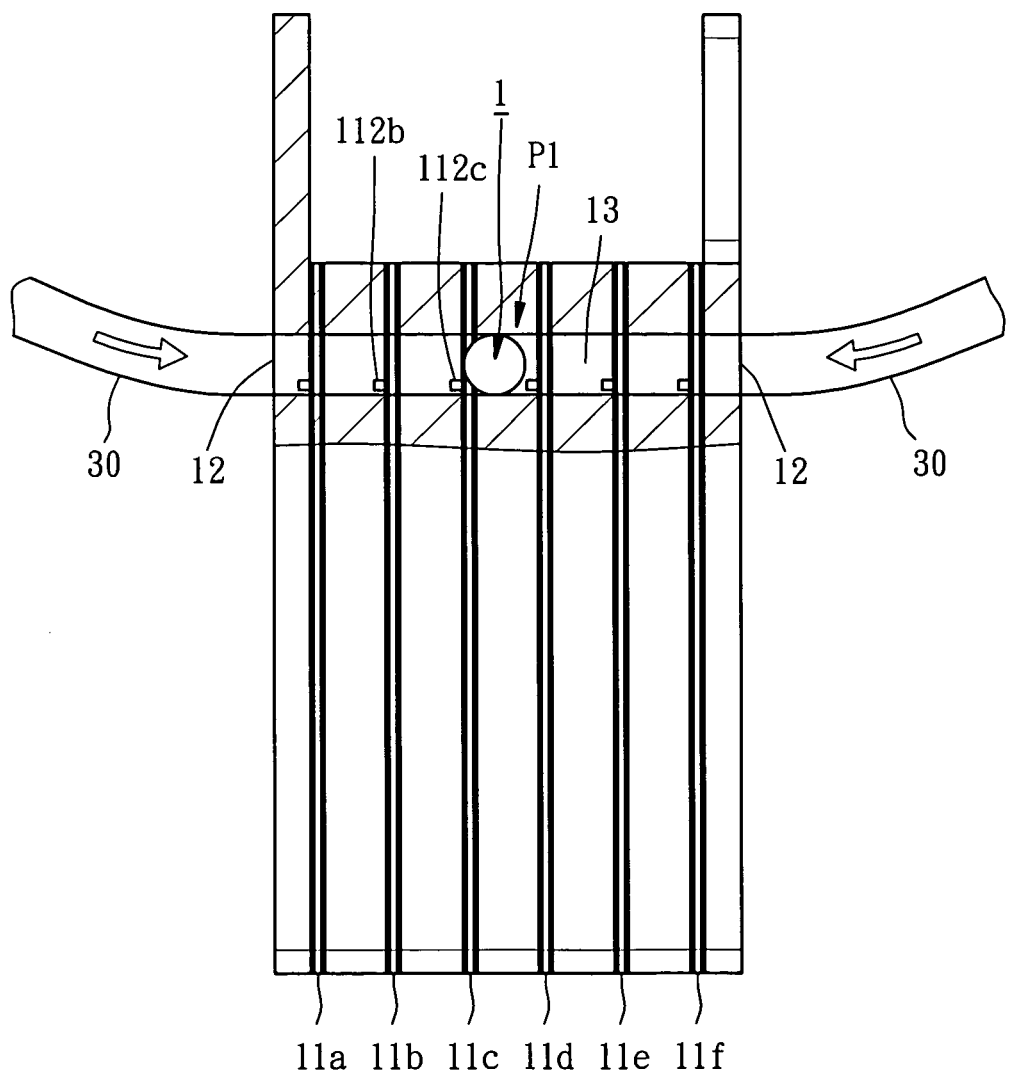
FIG. 3 is similar to FIG. 2, illustrating that the flow regulator is located at the first position.
Figure 4:
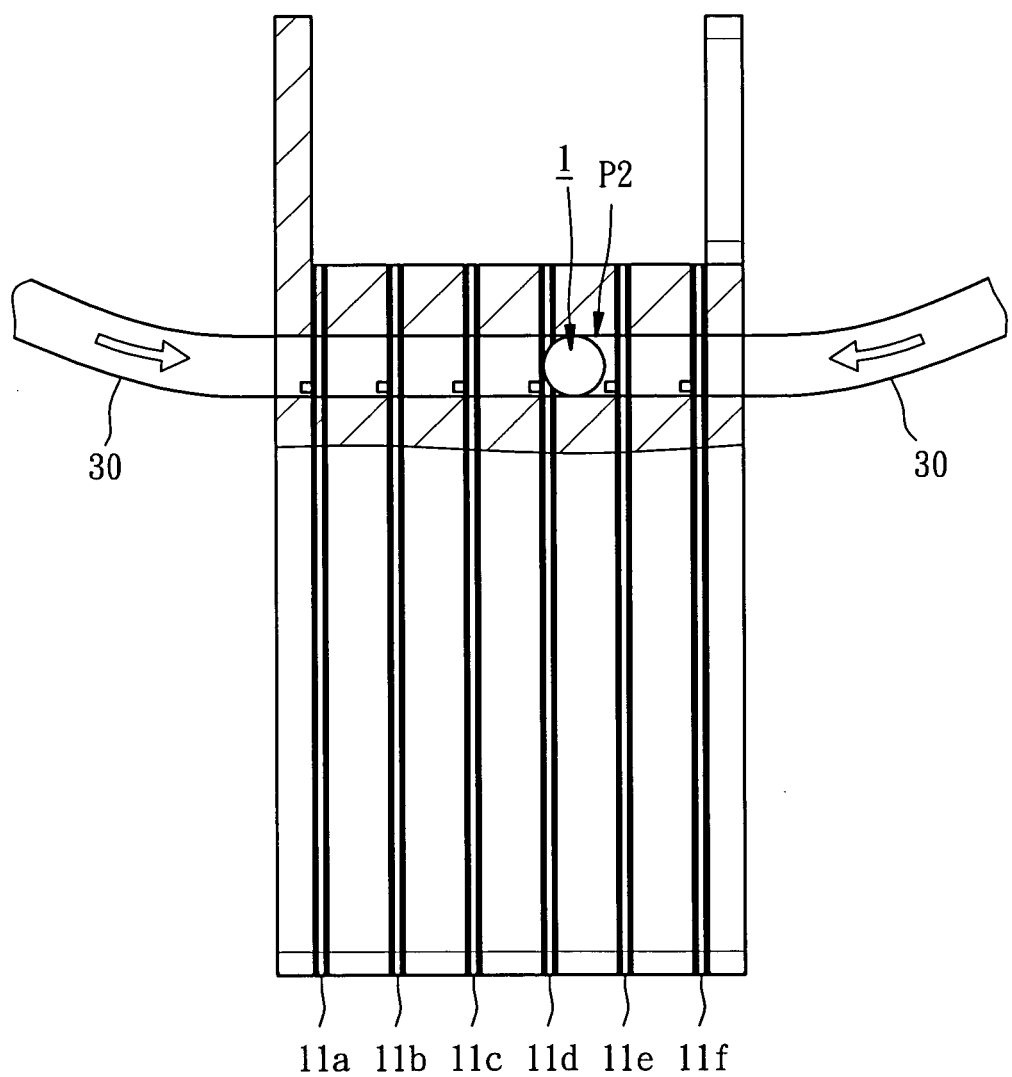
FIG. 4 is similar to FIG. 2, illustrating that the flow regulator is located at the second position.

Referring to FIGS. 3-4, the flow regulator 1 is mounted to the fuel tunnel 13 and can be moved back and forth along the fuel tunnel 13. It is to be noted that the flow regulator 1 can be spherical, columnar, plate-shaped, or in an alternative shape as long as it is subject to pushing by the fluid. In this embodiment, the flow regulator 1 is spherical.

Figure 5:
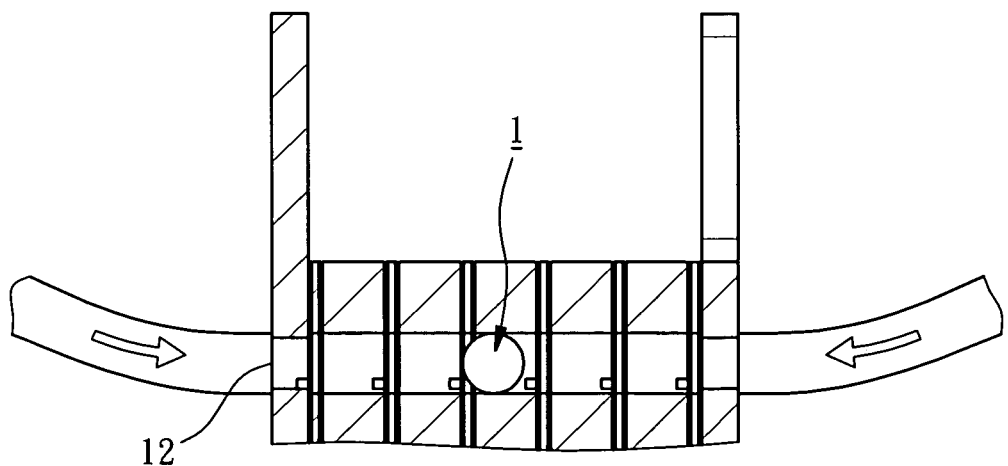
FIG. 5 is a partially sectional view of a second preferred embodiment of the present invention, illustrating that each of the entrances is smaller than the flow regulator in diameter.

The fuel cell 2 supplies the fuel by annular inflow. A pipeline 30 is branched into two separate branches for connection and communication with the entrances 12 of the fuel cell 2. The fuel in the pipeline 30 enters the fuel inlets 111a-111f of the single cells 11a-11f through the fuel tunnel 13 from the entrances 12 as indicated by hollow arrows shown in FIG. 3-5. When the moisture accumulation does not happen in the single cells 11a-11f, the pressures of the fuel at the inlets 111a-111f are not changed and the pressures at left and right side of the flow regulator 1 are equal, such that the flow regulator 1 remains at a first position P1. However, when the moisture accumulation happens in one of the single cells 11a-11f; for example, it happens in the third single cell 11c; the amount of the moisture accumulation obstructing the single cell 11c is different from those of the other single cells 11a-11b & 11d-11f that are not obstructed by any moisture accumulation, such that the pressures at the fuel inlet 111a-111f are affected to change. The pressure of the fuel at the fuel inlet 111c of the obstructed third single cell 11c becomes higher than the pressure of the fuel at the inlet of other, unobstructed single cells 11a-11b & 11d-11f. In the meantime, the pressures at the left and right sides of the flow regulator 1 are not balanced, pushing the flow regulator 1 towards one of the two adjacent sides having a lesser pressure, to a second position P2. For example, when the flow regulator 1 is moved to the fuel inlet 111d of the fourth fuel cell 11d, the fuel inlet 111d is blocked by the flow regulator 1 located at the second position P2 to decrease entry of the fuel. In the meantime, the other unblocked single cells 11a-11c & 11e-11f as the flow regulator is located at the second position P2 acquire more flow and pressure of the fuel than when the flow regulator is located at the first position P1, thus more effectively keeping the power generation of the fuel cell 2 stabler and facilitating the third single cell 11c to drain the accumulated moisture.

As the fuel cell 2 keeps reacting, the single cells 11a-11f may continue with the moisture accumulation and meanwhile, if the pressure at the fuel inlet of one of the single cells where the moisture accumulation happens is greater than that of the third single cell 11c, the flow regulator 1 will be moved to another fuel inlet and thus the overall pressure of the fuel inlets is regulated. Such regulation keeps working by the difference of the pressures at the fuel inlets 111a-111f to improve the stability and performance of the power generation of the fuel cell.

In a second preferred embodiment, each of the entrances 11 is smaller than the flow regulator 1 in diameter to confine the movement of the flow regulator 1 between the entrances 11 within the fuel tunnel 13 in such a way that a user, while dissembling or moving the fuel cell 2, does not have to worry that the flow regulator 1 disengages from the fuel cell 2.

In conclusion, the present invention can increase the pressure applied to the obstructed single cell due to the moisture accumulation to ensure full drainage of the moisture from the obstructed single cell; meanwhile, the pressures of the fuel at the other unobstructed single cells can be increased to make up for the decreased capacity of the obstructed single cell, definitely improving the stability of power generation and performance of the fuel cell 2.

Although the present invention has been described with respect to specific preferred embodiments thereof, it is in no way limited to the specifics of the illustrated structures but changes and modifications may be made within the scope of the appended claims.

What is claimed is:

1. A flow regulator for a fuel cell, the flow regulator being mounted to the fuel cell, the fuel cell having two entrances, each of which is formed at one of two sides of the fuel cell, the fuel cell having a plurality of single cells, each of which has a fuel inlet and a fuel passage in communication with the fuel inlet, the fuel passages jointly defining a fuel tunnel between and in communication with the entrances, wherein the flow regulator is located in the fuel tunnel and movable back and forth along the fuel tunnel responsive to a pressure difference of a fuel between the two entrances, and wherein an opening diameter of each of the entrances is smaller than a perimeter diameter of the flow regulator such that the flow regulator is prevented from passing outside of the fuel tunnel.

2. The flow regulator as defined in claim 1, wherein the flow regulator is a ball.

3. The flow regulator as defined in claim 1, wherein the flow regulator is a column.

4. The flow regulator as defined in claim 1, wherein the flow regulator is a plate.

* * * * *